Sept. 1, 1964  B. BARABACH ETAL  3,147,189
REACTOR PILE UNIT FOR STUDYING MATERIALS UNDER RADIATION
Filed May 12, 1961  8 Sheets-Sheet 3

INVENTORS
BORIS BARABACH
JACQUES BERGER
GÉRARD DUPUY
JEAN LACOUR
VICTOR RAIEVSKI
BY
Bacon & Thomas
ATTORNEYS Sept. 1, 1964   B. BARABACH ETAL   3,147,189
REACTOR PILE UNIT FOR STUDYING MATERIALS UNDER RADIATION
Filed May 12, 1961   8 Sheets-Sheet 4

INVENTORS
BORIS BARABACH
JACQUES BERGER
GÉRARD DUPUY
JEAN LACOUR
VICTOR RAIEVSKI
BY
Bacon & Thomas
ATTORNEYS

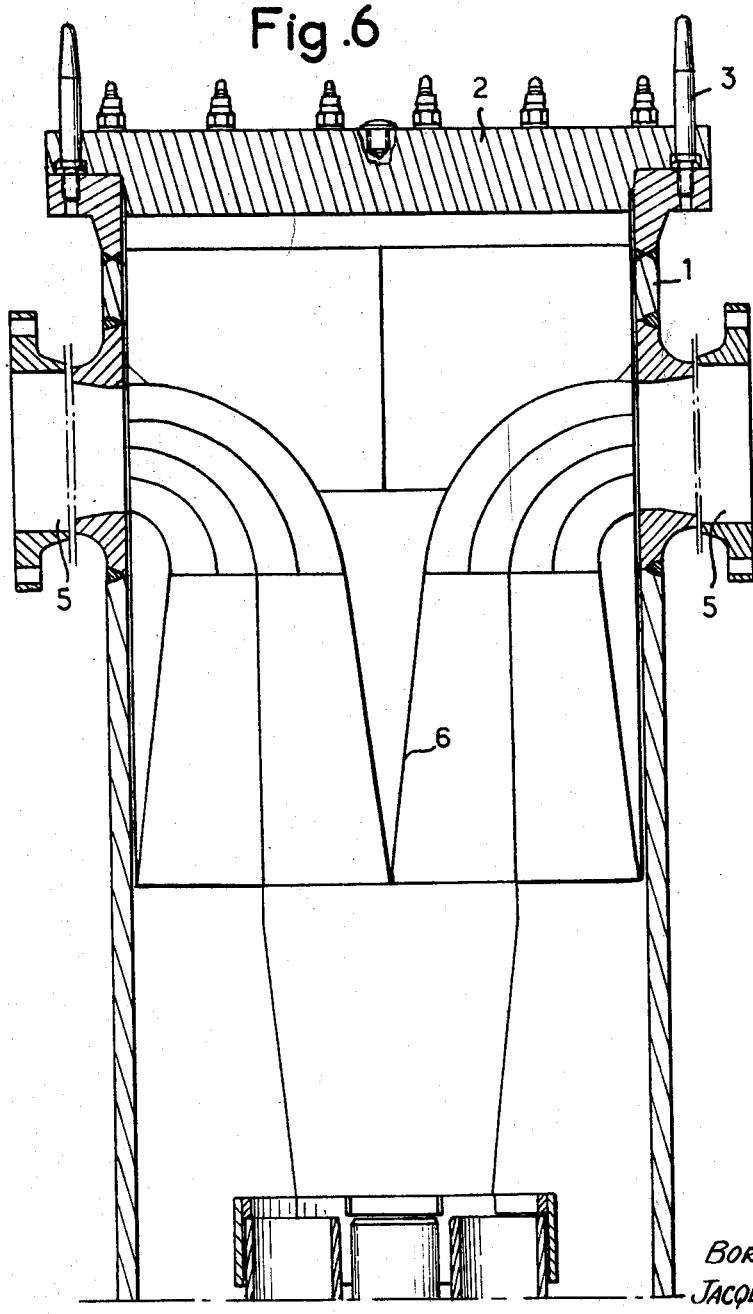

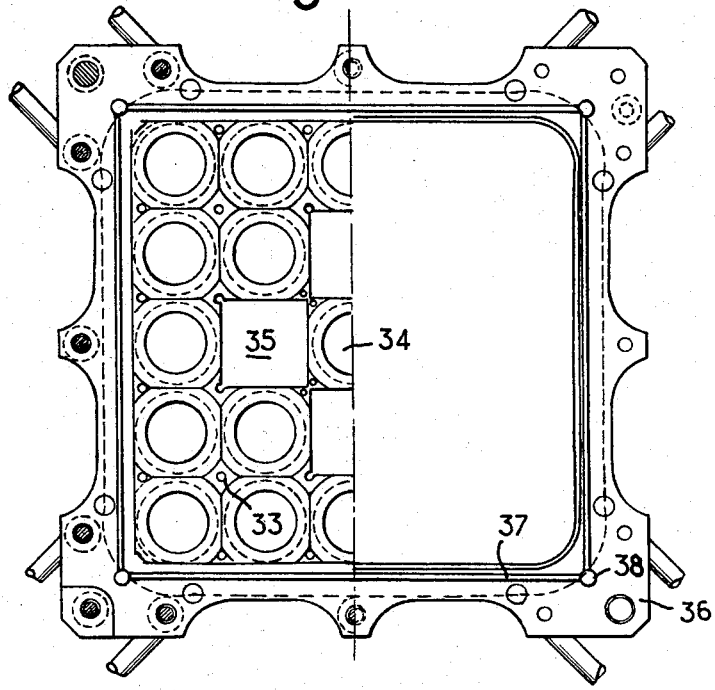
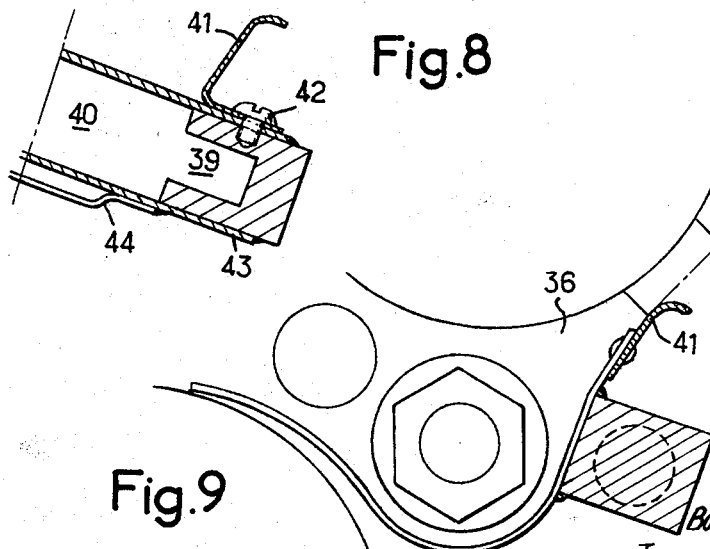

INVENTORS
BORIS BARABACH
JACQUES BERGER
GÉRARD DUPUY
JEAN LACOUR
VICTOR RAIEVSKI
BY
Bacon & Thomas
ATTORNEYS

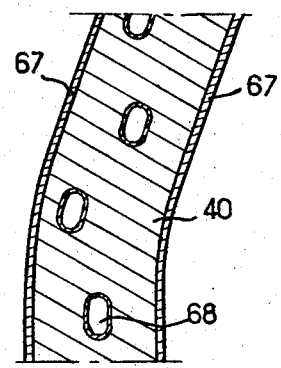
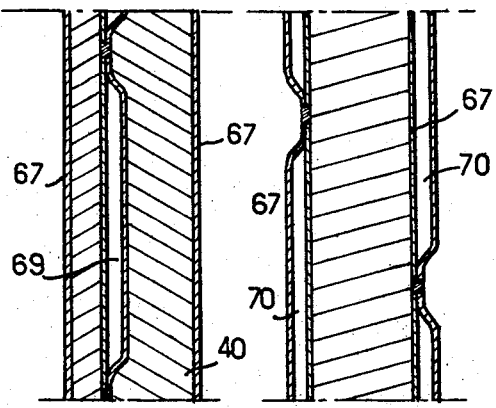
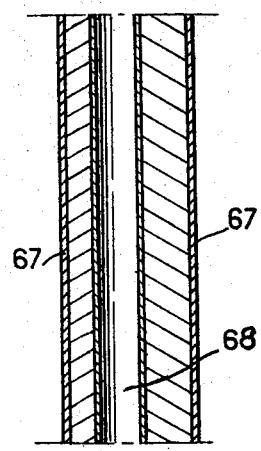
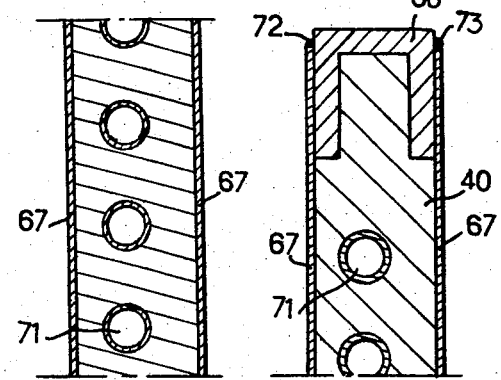
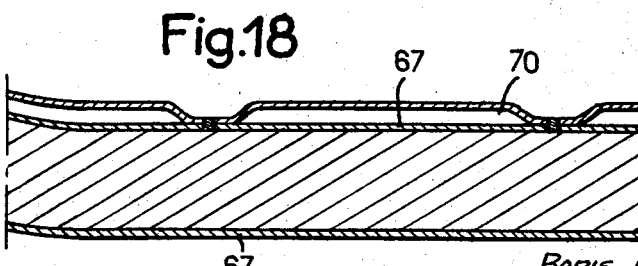

3,147,189
REACTOR PILE UNIT FOR STUDYING MATERIALS UNDER RADIATION

Boris Barabach, Sannois, Jacques Berger, Houilles, Gérard Dupuy, Paris, Jean Lacour, Sainte-Genevieve-des-Bois, and Victor Raievski, Chatenay-Malabry, France, assignors to Commissariat à l'Energie Atomique, Paris, France
Filed May 12, 1961, Ser. No. 109,714
Claims priority, application France May 20, 1960
8 Claims. (Cl. 176—62)

Development in the nuclear industry results in the need for easily accessible sources of radiation for studying the behaviour of certain materials under radiation.

To this end, some submerged piles in particular have been constructed wherein there is especially easy access to the region of the core. The present invention relates to a reactor of swimming pool type, wherein the core containing the fuel and its related members are situated at the centre of a water pool in a group called the "pile unit."

In such a reactor, self-contained loops are disposed round the pile unit, and the materials to be studied under radiation are placed, under special conditions, in the said loops. The said radiation is given off by the pile unit, which contains mainly the elements of fissile material and the control rods.

Such a pile unit must on the one hand be easily accessible in order that the fuel elements may be periodically replaced, and on the other hand its lateral faces must be as remote as possible in height below and above the core (the region of the pile-unit container in which the elements of fissile material are to be found), in order not to limit the vertical size of the self-contained loops.

In addition, manipulation of these loops must not be upset by the inlet and outlet pipes for the cooling water which flows through the pile unit.

The present invention relates to a reactor pile unit for studying materials under radiation which complies with the requirements enumerated above.

According to this invention there is provided a pile unit characterised in that it comprises a pressure-resistant immersed tank containing the core of the reactor and equipped with a top cover and means for closing the latter, cooling-water inlet pipes leading to the top of the enclosure and also steadying it mechanically, the said pipes opening out into the tank via divergent deflectors, a means, inside the tank, wherein the fuel elements are disposed, means for preventing the said fuel elements from vibrating when the water is circulating at high speed, sheaths whereof each contains a control rod and passes through the fuel-element region, means for holding the said sheaths at the top and bottom, pipes equipped with deflectors to remove the cooling water at the bottom of the enclosure, a fluid-tight plug passing through the bottom of the pool, the control-rod sheaths passing through the plug itself, means for preventing water leaks through the said plug, and means for preventing the contaminated water from remaining in the said plug, the external walls of the tank being equipped with screens and means for preventing the said screens from vibrating when the cooling water is circulating.

According to other features of the invention, the fuel elements are prevented from vibrating by equipping the said elements with retainer bosses made in one piece with them. Each element thus bears against the adjacent element in such a way as to form a mechanically rigid assembly. As a variant, the retainer bosses are replaced by leaf springs screwed to the fuel elements and fulfilling the same function as the said bosses.

The lower ends of the fuel elements rest on a grid. According to the invention, these ends are fitted into the grid in such a way as to enable the elements to be easily withdrawn without jamming, fixing in the vertical position being obtained by other means. Fitting is therefore limited. For this purpose, the feet of the fuel elements may be of conical shape or in the shape of a sector of a sphere, or they may comprise a downwardly directed shoulder. The orifices in the grid are such that fuel-element feet in any of the three above shapes can be accommodated in them.

A grid which retains and positions the control-rod sheaths is also provided, likewise for the purpose of preventing vibration when the water is flowing at high speed. This grid may be fixed either to the top cover of the tank or to the deflectors of the cooling-water inlet pipes. The sheaths are also equipped at the top with conical deflectors in order to facilitate water penetration.

The control rod sheaths pass through the floor of the pool in a cylindrical plug accommodated in the lower biological protection means of the pile. This plug is equipped with a water circuit for scavenging the clearances which are bound to exist between itself and the biological protection means; this has the consequence of preventing contaminated water originating from leaks from remaining in the said clearances.

The faces of the tank are fitted with lead screens in order to limit heating due to gamma irradiation while experiments are being carried out. In a preferred embodiment, these screens have water ducts passing through them to improve their cooling.

Other features of the invention will be apparent from the following description, with reference to the appended diagrammatic FIGURES 1 to 18, of the reactor pile unit for studying materials under radiation to which the invention relates.

FIGURE 6 is a sectional view on a larger scale of the upper end of the tank.

FIGURE 7 is a part-sectioned detailed view of the grid supporting the fuel elements in the core.

FIGURE 8 shows one end of a lead screen with its spring.

FIGURE 9 illustrates a method of fixing the lead screens.

FIGURES 12 to 18 illustrate various forms of embodiment of the lead screens.

Figure 1:
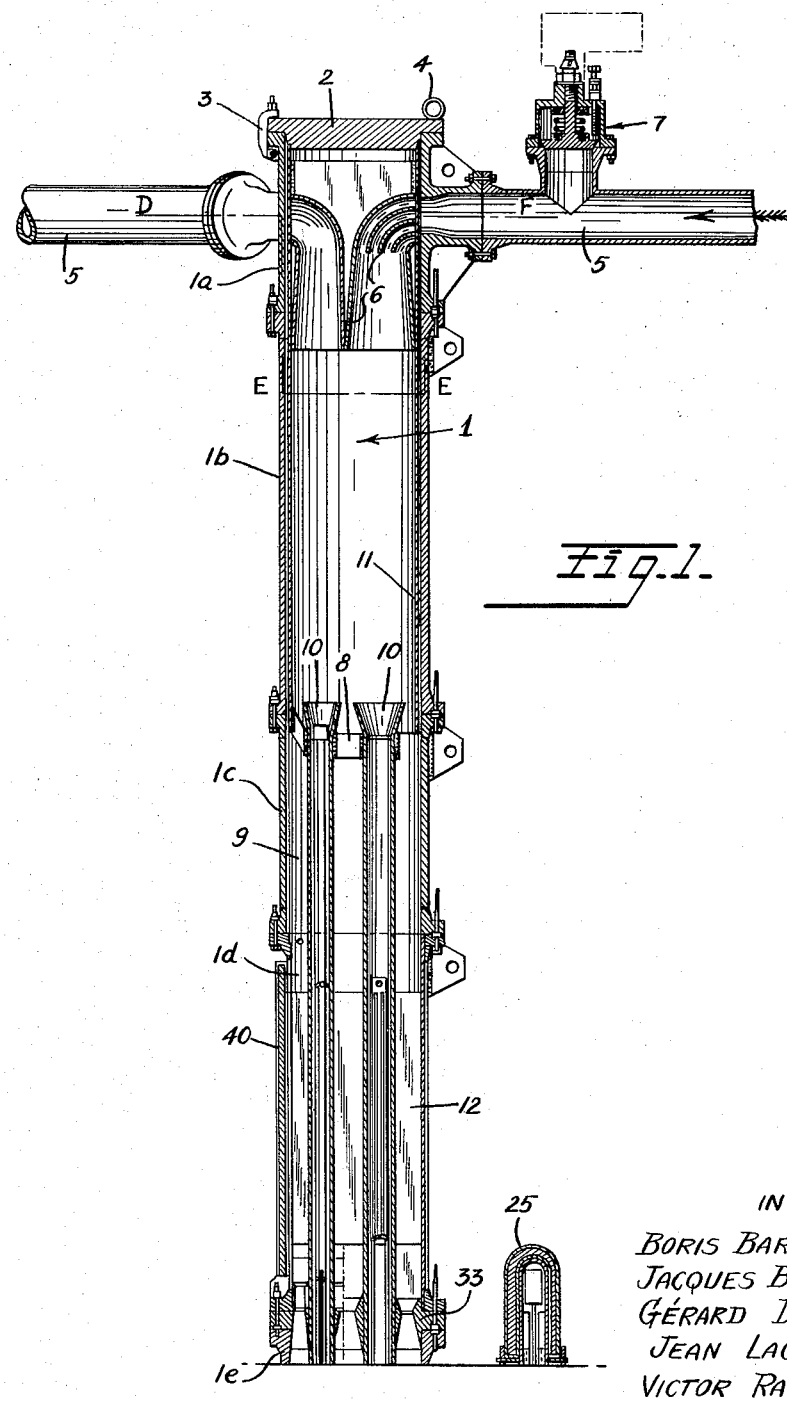
FIGURE 1 illustrates a sectional view of the upper part of the tank along the line A—B—C in FIGURE 3.
Figure 2:
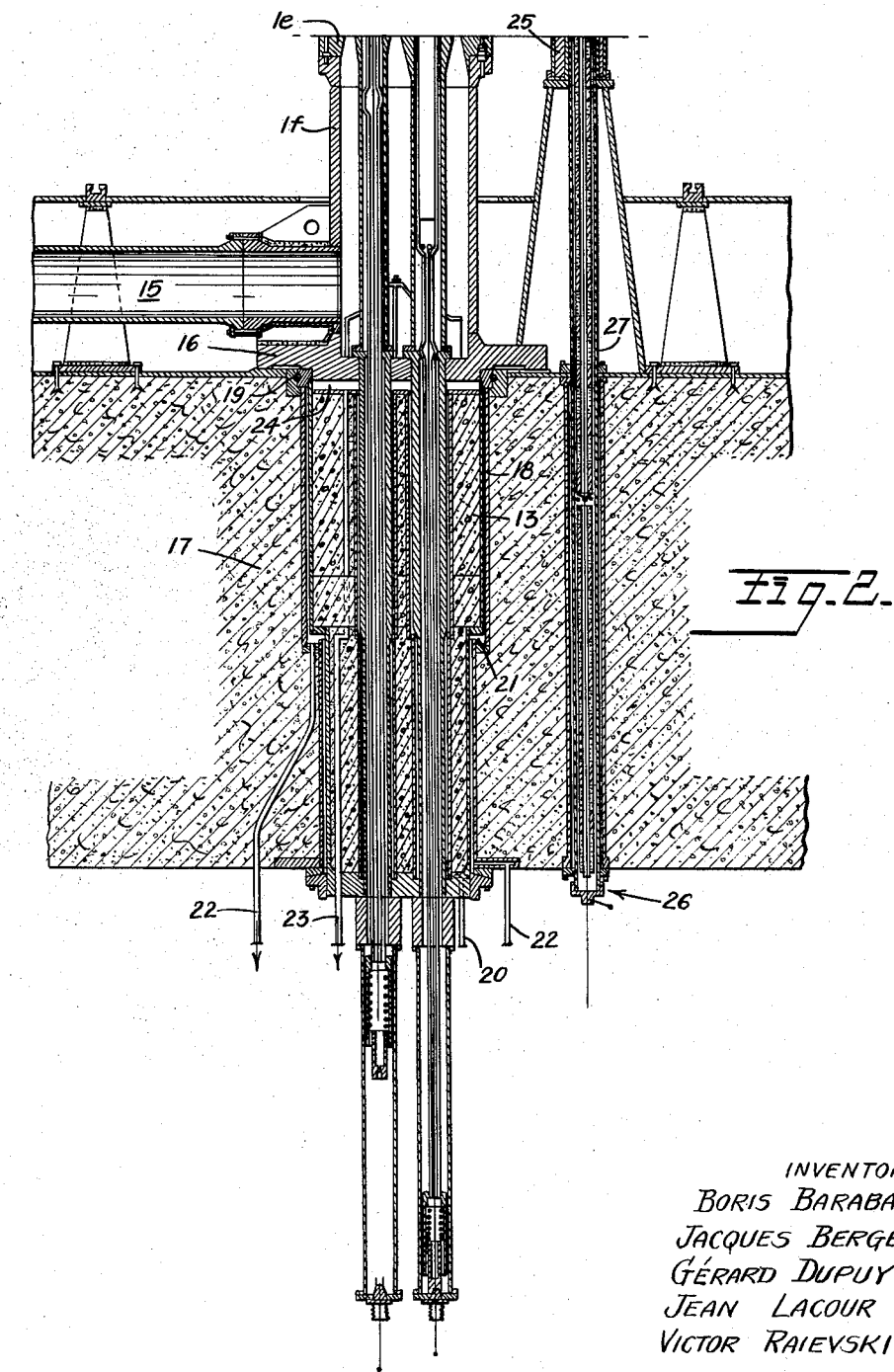
FIGURE 2 illustrates a sectional view of the lower part of the same tank and the plug which passes through the biological protection means.
Figure 3:
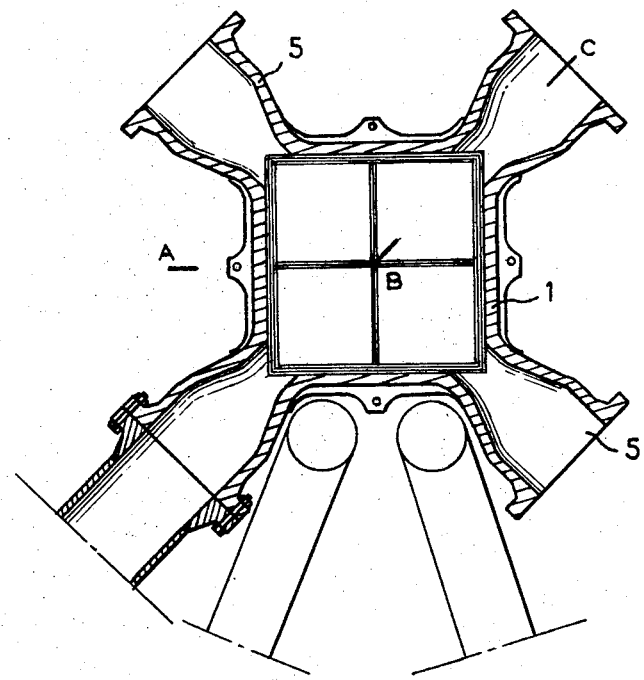
FIGURE 3 is a horizontal section through FIGURE 1, along the line D—E—F.

FIGURE 1 shows the upper part of the pile unit of a submerged reactor comprising tank 1 fitted with a cover 2 fixed by a device 3 which will be described later. The tank 1 is made up of a plurality of superposed cylinders 1a, 1b, 1c, 1d, 1e, 1f. The top of the cover is fitted with rings 4 for handling purposes. Four water-inlet pipes 5 (FIGURES 1 and 3) lead into the top of the tank. These pipes are extended inside the tank by deflectors 6 which facilitate the water flow. The said pipes 5 may be equipped with valves 7. This figure also shows the grid 8 which retains and guides the sheaths of the control rods 9, which guides comprise deflectors 10 at the top. The retainer and guide grid 8 is held by stays 11 fixed to the cover 2. In a variant, the grid 8 which retains and guides the sheaths may be fixed to the deflectors 6. These sheaths for control rods 9 pass through the region 12 which contains the fuel elements and through the plug 13 (FIGURE 2) which is provided to enable the said sheaths to pass in fluid-tight fashion through the lower biological protection means 17. FIGURE 2 also shows the deflectors 14 and the cooling-water outlet pipes 15.

The tank 1 and pile unit as a whole rests on a base 16, and the latter itself rests on the biological protection means 17. A fluid-tight seal between this base and the clearances 18 between the plug 13 and the biological protection means 17 is provided by packings 19. To prevent any possible leaks via the clearances 18, water scavenging is provided between the biological protection means 17 and the plug 13. This scavenging water is injected via the pipe 20, circulates in the channel 21, and re-emerges via the pipes 22. There is also a pipe 23 to carry away any water which might penetrate into the space 24 between the base 16 and the plug 13. These two figures also show an ionisation chamber 25 in the pool; such chambers, of which only one is shown, are controlled from a control position 26 disposed below the lower biological protection means of the pool. These ionisation chambers are controlled from the position 26 by means of glove-fingers 27 which pass in fluid-tight fashion through the biological protection means 17.

Figure 4:
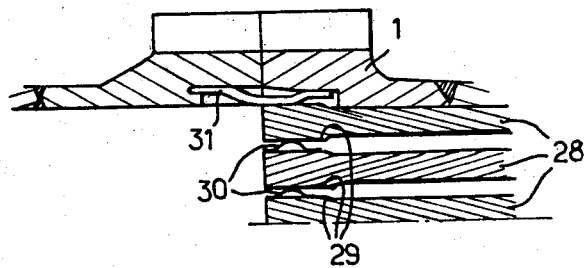
FIGURE 4 is a view showing the leaf springs which serve to wedge the fuel elements in the core.

FIGURE 4, which is a fragmentary longitudinal sectional view through the upper portion of the fuel elements, illustrates the fuel elements 28 disposed in the tank. To prevent undesirable vibration in these elements 28, which comprise bosses 29 at the top, leaf springs 30 are fixed to the said bosses. Springs 31 are likewise fixed to the walls of the enclosure on a level with the upper ends of the fuel rods in order to prevent this same undesirable vibration.

Figure 5:
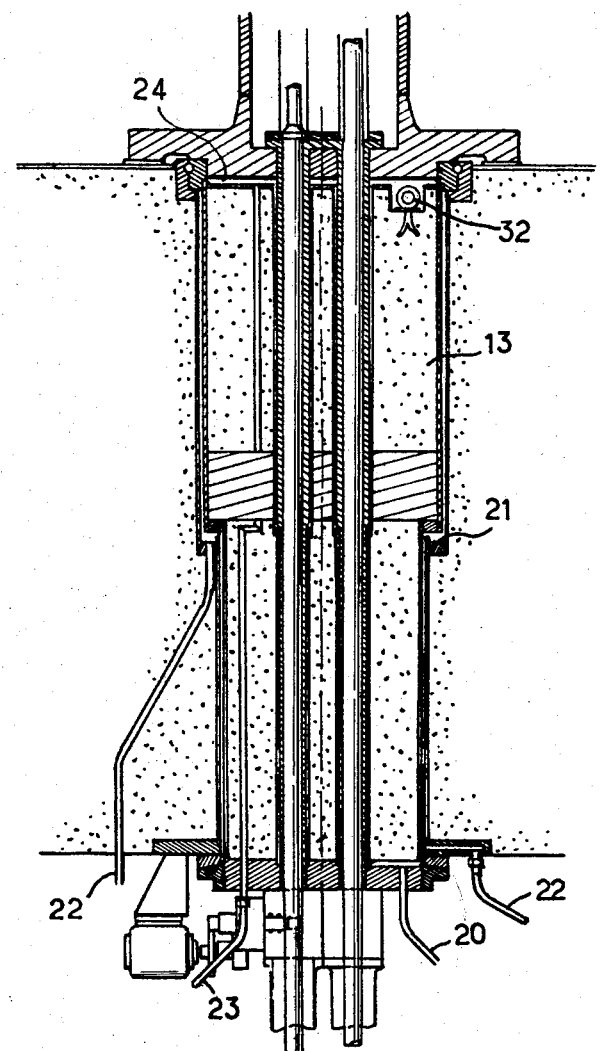
FIGURE 5 is a section on a larger scale through the fluid-tight plug which passes through the lower biological protection means.

FIGURE 5, which is an enlarged view of the plug 13, more clearly shows the elements previously enumerated, such as the channel 21, the inlet and outlet pipes 20 and 22 for the scavenging water, and the pipe 23 through which water penetrating into the space 24 flows away. This FIGURE 5 shows a ring 32 which serves for handling the plug 13 should it be required to dismantle the pile.

FIGURE 6 shows the cover 2 fixed to the tank 1 by the devices 3, the entry of the pipes 5 and the deflectors 6.

FIGURE 7 shows the grid 33 with its orifices 34 in which the lower ends of the fuel elements rest. The passages 35 in the said grid for the control-rod sheaths are likewise shown. To prevent any possible leaks between the various parts 1a, 1b, 1c, 1d, 1e, 1f of the tank 1, the collar 36 is formed with a channel 37 into which there lead four pipes 38; leaks are continuously aspirated through these pipes.

These leaks always occur from the pile unit to the pool, in view of the fact that the water circulating in the tank 1 is under greater pressure than the water in the pool. The water circulated in tank 1 is separate from the water in the pool, the latter being supplied and maintained from any suitable source separate from the water in tank 1.

FIGURE 8 shows one end 39 of one of the lead screens. These lead screens are indicated in FIGURE 1 by the reference 40. The said screens surround the tank 1 in the region of the core, thus limiting heating due to gamma radiation.

To prevent the screens 40 from vibrating during operation, leaf springs 41 fixed by screws 41 are disposed at the end 39 of the said screens. These springs 41 bear against the tank 1, when the screens are in place as indicated in FIG. 1, thus preventing vibration. Corrugated members 44 may be welded to the casings 43 of the lead screens 40 to order to cool the latter (see FIGURES 8 and 18). In a variant of this embodiment, cooling ducts of circular or elliptical cross-section are directly disposed, in horizontal or vertical fashion, in the lead screen, and open out into headers fast with the vertical sides of the frame of the screen 39. These headers are not illustrated in the figures, in order not to make them unnecessarily complicated.

In another variant of embodiment, the spring 41' which prevents the lead screens from vibrating may be disposed on the flanges 36 of tank 1, as illustrated in FIGURE 9, to bear against the frame of the lead screens.

Figure 10:
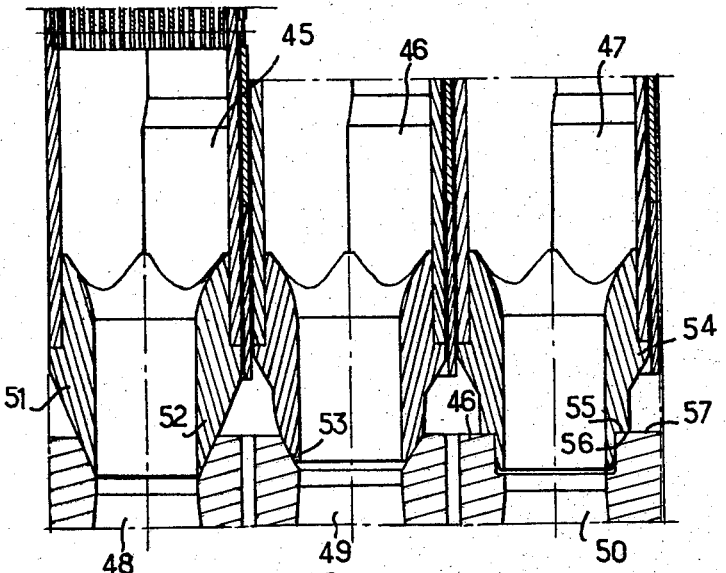
FIGURE 10 illustrates three possible methods of fitting the feet of the fuel elements into the orifices in the grid.

FIGURE 10 shows three methods of fitting the feet of the fuel elements 45, 46 and 47 into three orifices 48, 49 and 50 in a lower grid 33 in tank 1, as seen in FIG. 1. In the first method, the foot of the fuel element 45 is in the shape of a cone 51, which bears against a conical wall 52 of the orifice 48. In the second method of fitting, the foot of the fuel element 46 is in the shape of a spherical sector, and bears against a wall 53 of the orifice 49, which is likewise in the shape of a spherical sector. In the third method of fitting, the foot 54 of the fuel element 47 comprises a downwardly directed shoulder 55 at the bottom, resting on a shoulder 56 in the periphery 57 of the orifice 50.

Figure 11:
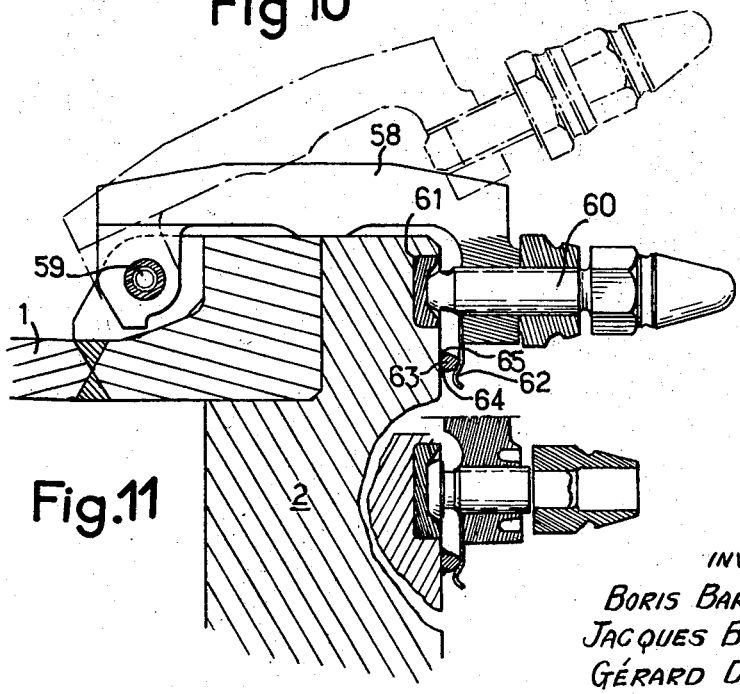
FIGURE 11 illustrates the system of closing the cover of the tank.

FIGURE 11 shows the device which serves to tighten the cover 2 on to the tank 1. This device comprises a piece 58 which can be moved on the enclosure 1 about the spindle 59, and comprises a screw 60 at the top. Upon tightening, this screw bears against a pad 61. To keep the piece 58 in the vertical position before tightening, a leaf spring 62 fast with the said piece 58 bears against a shoulder 63 welded to the cover 2 at 64 and 65.

The lead screens disposed outside the tank 1 on a level with the core may be cooled in various ways. The various types of screens are illustrated in FIGURES 12 to 18. These screens are held in a frame 66 (see FIGURE 17), and covered with a casing 67. FIGURE 12 shows a lead screen 40 cooled by water circulating in vertical tubes 68 of elliptical cross-section.

FIGURE 13 illustrates a lead screen 40 held in a casing 67. This type of screen is cooled by water circulating in pipes 69 of substantially rectangular cross-section. This gives a water-circulation in the lead having a surface area practically equal to that of the lead screen.

FIGURE 14 illustrates a lead screen comprising corrugated members 70 on either side of the casing 67. Both surfaces of such a lead screen are in contact with the cooling water.

In FIGURE 18, which illustrates a variant of the embodiment shown in FIGURE 14, the cooling water circulates in the corrugated members 70, but only on one side of the screen.

FIGURES 15 and 16 illustrate two variants of the embodiment illustrated in FIGURE 12.

In FIGURE 15, the ducts 68 are horizontal, and in FIGURE 16 the ducts 71 are of circular cross-section.

FIGURE 17 illustrates the frame 66 of a lead screen 40, and also the casing 67, which is welded to the frame 66 at 72 and 73.

We claim:

1. In a swimming pool reactor; means including a bottom wall for containing said pool; an opening in said bottom wall and a plug sealing said opening; an upstanding pressure resistant tank mounted in said pool over said plug; a reactor core containing fuel elements in said tank; coolant inlet pipes extending laterally into the upper portion of said tank and having downwardly directed deflectors at their inner ends, a coolant outlet pipe extending into said tank at the bottom thereof for circulating cooling water through said tank separate from and independently of the water in the pool; said reactor core comprising means supporting fuel elements and at least one guiding sheath between certain of said fuel elements, said guiding sheath extending downwardly through said tank and said plug for guiding a control rod to and through said core;

sealing means between an upper portion of said plug and said bottom wall and a space between said plug and bottom wall below said sealing means; means for draining any contaminated water from said space; and radiation absorbent screens surrounding said tank outwardly of said reactor core.

2. A reactor as defined in claim 1, wherein said reactor core comprises a supporting grid having spaced recesses therein; said fuel elements each having a foot portion resting in one of said recesses.

3. A reactor as defined in claim 2 wherein said recesses and foot portions are of complementary conical shape.

4. A reactor as defined in claim 2 wherein said recesses and foot portions engage each other at a part-spherical surface.

5. A reactor as defined in claim 2 wherein each recess defines an annular shoulder; each foot portion being stepped to define a shoulder resting on an annular shoulder.

6. A reactor as defined in claim 1, wherein said tank is provided with a removable cover at its upper end; there being a plurality of said guiding sheaths extending above said fuel elements; said guiding sheaths being supported at their upper ends by a grid fixedly secured to said cover.

7. A reactor as defined in claim 1 wherein said tank comprises abutting flanged sections having their flanges secured together in face-to-face relation; and means defining a channel at the interface between said flanges for collecting and draining water leaking between said flanges.

8. A reactor as defined in claim 1 wherein said radiation absorbent screens are made of lead and are provided with passages for the circulation of cooling water therethrough.

References Cited in the file of this patent

UNITED STATES PATENTS 2,982,710     Leyse et al. _____ May 2, 1961
2,992,176     Schoessow _____ July 11, 1961

OTHER REFERENCES

Proceedings of the Second United Nations International Conference on the Peaceful Uses of Atomic Energy, vol. 7, United Nations, Geneva, 1958, pp. 504–514, 518–523, 537–543.